United States Patent
Feng et al.

(10) Patent No.: US 10,743,324 B2
(45) Date of Patent: Aug. 11, 2020

(54) METHOD AND DEVICE FOR ALLOCATING CELL RESOURCES OF A DEVICE TO DEVICE SYSTEM

(71) Applicant: China Academy of Telecommunications Technology, Beijing (CN)

(72) Inventors: Yuan Feng, Beijing (CN); Jiye Tang, Beijing (CN); Haijun Zhou, Beijing (CN); Jiayi Fang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 15/751,477

(22) PCT Filed: Aug. 22, 2016

(86) PCT No.: PCT/CN2016/096276
§ 371 (c)(1),
(2) Date: Feb. 9, 2018

(87) PCT Pub. No.: WO2017/036321
PCT Pub. Date: Mar. 9, 2017

(65) Prior Publication Data
US 2018/0234982 A1  Aug. 16, 2018

(30) Foreign Application Priority Data

Aug. 31, 2015  (CN) .......................... 2015 1 0549373

(51) Int. Cl.
*H04W 72/08* (2009.01)
*H04W 16/14* (2009.01)
(Continued)

(52) U.S. Cl.
CPC ......... *H04W 72/082* (2013.01); *H04W 16/14* (2013.01); *H04W 28/16* (2013.01); *H04W 92/18* (2013.01)

(58) Field of Classification Search
CPC ... H04W 72/082; H04W 16/14; H04W 28/16; H04W 92/18; H04W 8/005; H04W 48/10; H04W 72/04; H04W 72/12
See application file for complete search history.

(56) References Cited

U.S. PATENT DOCUMENTS

2012/0243431 A1* 9/2012 Chen ................ H04W 72/0406
                                                      370/252
2013/0022010 A1* 1/2013 Qianxi ................ H04L 5/0033
                                                      370/329
(Continued)

FOREIGN PATENT DOCUMENTS

CN   103781050 A   5/2014
CN   104219675 A   12/2014
(Continued)

OTHER PUBLICATIONS

CATT:"D2D Communication Resource Allocation Mode 2", 3GPP Draft; R2-141196, 3rd Generation Partnership Project (3GPP), Mobile Competence Centre ; 650, Route Des Lucioles, Mar. 22, 2014, 3 pages.
(Continued)

*Primary Examiner* — Kibrom T Hailu
(74) *Attorney, Agent, or Firm* — Kilpatrick Townsend & Stockton, LLP

(57) ABSTRACT

Disclosed are a method and device for allocating cell resources of a device to device (D2D) system, which are used for improving the communication reliability of nodes located in different cell edge areas in an edge area ad hoc network manner. Provided is a method for allocating cell resources of a device to device (D2D) system, comprising:
(Continued)

determining an edge area for D2D resource coordination of a cell; and allocating a resource pool to a node in the edge area, wherein the node in the edge area selects a resource from the resource pool in an ad hoc manner for communication, the resource being a time slot or time frequency block.

8 Claims, 2 Drawing Sheets

(51) Int. Cl.
*H04W 28/16* (2009.01)
*H04W 92/18* (2009.01)

(56) References Cited

U.S. PATENT DOCUMENTS

| | | | |
|---|---|---|---|
| 2013/0308551 A1 | 11/2013 | Madan et al. | |
| 2014/0273862 A1* | 9/2014 | Maaref | H04J 11/0026 455/63.1 |
| 2015/0189636 A1* | 7/2015 | Liu | H04W 28/16 370/330 |
| 2015/0215903 A1* | 7/2015 | Zhao | H04W 72/04 370/329 |
| 2015/0271810 A1* | 9/2015 | Sartori | H04L 5/14 370/280 |
| 2016/0057604 A1* | 2/2016 | Luo | H04W 8/005 370/330 |
| 2016/0135201 A1* | 5/2016 | Brahmi | H04L 5/006 370/329 |
| 2017/0230984 A1* | 8/2017 | Wang Helmersson | H04W 72/082 |

FOREIGN PATENT DOCUMENTS

| | | |
|---|---|---|
| CN | 104410975 A | 3/2015 |
| CN | 104812025 A | 7/2015 |
| WO | 2011069295 A1 | 6/2011 |
| WO | 2013113371 A1 | 8/2013 |
| WO | 2015109010 A1 | 7/2015 |

OTHER PUBLICATIONS

Huawei et al: "Distributed resource allocation from mode-2", 3GPP Draft; R1-141929, 3rd Generation Partnership Project (3GPP), Mobile Competence Centre ; 650, Route Des Lucioles; May 18, 2014, 4 pages.

Huawei et al: "Definition of coverage zones for D2C communication"; 3GPP Draft; R1-142543, 3rd Generation Partnership Project (3GPP); Mobile Competence Centre ; 650, Route Des Lucioles, May 18, 2014, 4 pages.

* cited by examiner

METHOD AND DEVICE FOR ALLOCATING CELL RESOURCES OF A DEVICE TO DEVICE SYSTEM

This application is a National Stage of International Application No. PCT/CN2016/096276, filed Aug. 22, 2016, which claims the benefit of Chinese Patent Application No. 201510549373.9, filed Aug. 31, 2015, both of which are hereby incorporated by reference in their entireties.

FIELD

The present invention relates to the field of communications, and particularly to a method and apparatus for allocating a cell resource in a Device-to-Device (D2D) system.

BACKGROUND

Services in an internet-of-vehicles system can be generally categorized into three categories of road security, traffic efficiency, and information and entertainment, where the services in the category of road security are the most predominant, and also the most typically services in the internet-of-vehicles system. Active security applications in the internet-of-vehicles system generally operate with an ad-hoc network, and a cellular mobile communication network is characterized by a wide coverage area, and a perfect system. The cellular mobile communication network operates with the cellular D2D technologies for the combination of their advantages, so a D2D link resource can be allocated more flexibly in the cellular D2D solution operating in a small area.

In an internet-of-vehicles communication system in which the vehicles are secured actively, information about vehicles and roads is obtained, and the information is exchanged and shared between the vehicles, and between the vehicles and the roads, so that the vehicles and the infrastructure cooperate and interoperate intelligently with each other for the purpose of optimizing an access to system resources, improving the security of traffic on the roads, and alleviating traffic congestion.

A short communication delay is required in the internet-of-vehicles communication system in which the vehicles are secured actively, so the ad-hoc network technologies operating with short-range communication are generally applied thereto. At present, there are generally two ad-hoc network technologies, dependent upon how radio resources are accessed, in the field of internets of vehicles, where one ad-hoc network technology is the 802.11p based Dedicated Short Range Communication (DSRC) technology, which is an ad-hoc network for asynchronous communication; and the other ad-hoc network technology is an ad-hoc network for synchronous communication represented by the Mobile Slotted ALOHA (MS-ALOHA) technology.

With semi-static interference coordination in an LTE system, uplink and downlink load information is passed via an X2 interface between eNBs, real-time information about resource accesses and interference conditions is obtained as much as possible, and the allocation of resources is adjusted semi-statically.

Furthermore there is the following drafted solution to resource coordination between cells in the development of the 3GPP D2D standard.

As illustrated in FIG. 1, an inter-eNB D2D discovery and communication can be made between a User Equipment (UE) 1, a UE3, and a UE5 residing at or connected with an evolved node B (eNB) 1, an eNB2, and an eNB3. The UE1 needs to know configuration information of a pool of D2D receive resources of the current cell eNB1, and also configuration information of pools of D2D receive resources of the eNB2 and the eNB3 in adjacent cells, so that the UE1 can make a D2D discovery and communication with the UE3 and the UE5. After the eNB1 obtains the configuration information of the pools of D2D receive resources of the eNB2 and the eNB3, the eNB can notify the UE1 of the configuration information by broadcasting it via an air interface, or via dedicated information.

How the eNB receives the configured pools of D2D receive resources of the eNB2 and the eNB3 depends upon how a pool of D2D transmit resources is configured in the inter-eNB scenario. At present, there may be the following three schemes to configure a pool of D2D transmit resources in the inter-eNB scenario.

In a first scheme, there is the same pool of D2D transmit resources for the different eNBs.

In a second scheme, pools of D2D transmit resources for the different eNBs partially overlap.

In a third scheme, there are totally different pools of D2D transmit resources for the different eNBs.

In the first scheme, if there is the same pool of D2D transmit resources for the different eNBs, then the eNB1 will not obtain any information about pools of D2D transmit resources for the other eNBs via the X2 interface, or through an Operation, Administration, and Maintenance (OAM) entity. In the second and third schemes, since pools of D2D transmit resources for the different eNBs partially non-overlap, then the eNB1 will obtain the information about the pools of D2D transmit resources for the other eNBs via the OAM entity, or via X2 interface.

During the RAN3#83 session, a preliminary discussion was made about inter-eNB D2D resource negotiation in a synchronous scenario, but no discussion was made about a particular resource configuration mechanism in the inter-eNB scenario, except that it was identified that information about a resource of transmit (TX) resources can be exchanged between eNBs via an X2 interface if necessary. However inter-eNB coordination via an X2 interface has not been standardized later in RAN3.

In summary, there has been absent in the prior art a specific resource configuration solution in the D2D solution, and the second and third schemes are preferred from the perspective of the existing standard. Generally the resources are also coordinated at the granularity of a pool of transmit resources in the entire cell, but if there are a large number of vehicles, for example, not all the resources can be allocated in a cell, then a capacity demand in the cell in which there are a large number of vehicles may not be satisfied, thus degrading the reliability of communication in a node at the edge of the cell.

SUMMARY

Embodiments of the invention provide a method and apparatus for allocating a cell resource in a Device-to-Device (D2D) system so as to improve the reliability of communication at nodes in edge areas of different cells over an ad-hoc network in the edge areas.

An embodiment of the invention provides a method for allocating a cell resource in a Device-to-Device (D2D) system, the method includes: determining an edge area, to be D2D-resource coordinated, of a cell; and allocating a pool of resources for a node in the edge area, wherein the node in the edge area selects a resource from the pool of resources in an ad-hoc mode, and communicates over the resource, and the resource is a timeslot or a time-frequency block.

With this method, the edge area, to be D2D-resource coordinated, of the cell is determined; and the pool of resources is allocated for the node in the edge area, where the node in the edge area selects a resource from the pool of resources in an ad-hoc mode, and communicates over the resource, and the resource is a timeslot or a time-frequency block, so that the edge area is defined, and the ad-hoc mode is applied to the edge area, thus improving the reliability of communication between nodes in edge areas of different cells.

Preferably the determining the edge area of the cell includes: determining the edge area of the cell according to a shortest resource multiplexing distance, the size of the cell, and an allocation of the pool of resources.

Preferably the edge area in the cell shares a pool of resources with a central area other than the edge area; or shares resources allocated for the edge area with an adjacent cell to the cell.

Preferably the method further includes: determining collision occurring between a node in a central area of the present cell, and a node in an edge area of an adjacent cell according to strong interference information reported by the node in the edge area of the present cell, positional information of the node, and positional information of a node occupying the timeslot with resource collision, indicated by the node reporting the strong interference information, and the shortest resource multiplexing distance, upon reception of the reported strong interference information, and to adjust a resource of the node in the central area of the present cell; and/or to determine collision occurring between a node in a central area of the present cell, and a node in a central area of an adjacent cell according to strong interference information reported by the node in the central area of the present cell, positional information of the node, and positional information of a node occupying the timeslot with resource collision, indicated by the node reporting the strong interference information, and the shortest resource multiplexing distance, upon reception of the reported strong interference information, and to adjust a resource of the node in the central area of the present cell.

Preferably the method further includes: in the case that a node in a central area of the present cell shares a resource with the node in the edge area, receiving information which is about the resource occupied by the node in the edge area and transmitted by the node in the edge area, and allocating a resource for the node in the central area according to the information about the resource occupied by the node in the edge area.

Preferably when the edge area shares resources allocated for the edge area with an adjacent cell to the cell, a resource accessed by a node in a central area in the same cell is orthogonal to a resource accessed by the node in the edge area.

Preferably different resources are allocated for the edge areas of different cells; or a same resource is allocated by a second unit in an adjacent eNB for the edge area of the adjacent cell.

An embodiment of the invention provides an apparatus for allocating a cell resource in a Device-to-Device (D2D) system, the apparatus includes: a first unit configured to determine an edge area, to be D2D-resource coordinated, of a cell; and a second unit configured to allocate a pool of resources for a node in the edge area, wherein the node in the edge area selects a resource from the pool of resources in an ad-hoc mode, and communicates over the resource, and the resource is a timeslot or a time-frequency block.

Preferably the first unit is configured to determine the edge area of the cell according to a shortest resource multiplexing distance, a size of the cell, and an allocation of the pool of resources.

Preferably the edge area in the cell shares a pool of resources with a central area other than the edge area or shares resources allocated for the edge area with an adjacent cell to the cell.

Preferably the second unit is further configured to determine collision occurring between a node in a central area of the present cell, and a node in an edge area of an adjacent cell according to strong interference information reported by the node in the edge area of the present cell, positional information of the node, and positional information of a node occupying the timeslot with resource collision, indicated by the node reporting strong interference information, and the shortest resource multiplexing distance, upon reception of the reported strong interference information, and to adjust a resource of the node in the central area of the present cell; and/or to determine collision occurring between a node in a central area of the present cell, and a node in a central area of an adjacent cell according to strong interference information reported by the node in the central area of the present cell, positional information of the node, and positional information of a node occupying the timeslot with resource collision, indicated by the node reporting strong interference information, and the shortest resource multiplexing distance, upon reception of the reported strong interference information, and to adjust a resource of the node in the central area of the present cell.

Preferably the second unit is further configured, in a case that a node in a central area of the present cell shares a resource with the node in the edge area, to receive information which is about the resource occupied by the node in the edge area and transmitted by the node in the edge area, and to allocate a resource for the node in the central area according to the information about the resource occupied by the node in the edge area.

Preferably when the edge area shares resources allocated for the edge area with an adjacent cell to the cell, a resource accessed by a node in a central area in the same cell is orthogonal to a resource accessed by the node in the edge area.

Preferably the second unit allocates different resources for the edge areas of different cells; or a same resource is allocated by a second unit in an adjacent eNB for the edge area of the adjacent cell.

An embodiment of the invention provides an apparatus for allocating a cell resource in a Device-to-Device (D2D) system, the apparatus includes a processor configured to read and execute program in a memory, to determine an edge area, to be D2D-resource coordinated, of a cell; and to allocate a pool of resources for a node in the edge area, wherein the node in the edge area selects a resource from the pool of resources in an ad-hoc mode, and communicates over the resource, and the resource is a timeslot or a time-frequency block.

Preferably the processor is configured to determine the edge area of the cell according to a shortest resource multiplexing distance, a size of the cell, and an allocation of the pool of resources.

Preferably the edge area in the cell shares a pool of resources with a central area other than the edge area; or shares resources allocated for the edge area with an adjacent cell to the cell.

Preferably the processor is further configured to determine collision occurring between a node in a central area of the present cell, and a node in an edge area of an adjacent cell according to strong interference information reported by the node in the edge area of the present cell, positional information of the node, and positional information of a node occupying the timeslot with resource collision, indicated by the node reporting strong interference information, and the shortest resource multiplexing distance, upon reception of the reported strong interference information, and to adjust a resource of the node in the central area of the present cell; and/or to determine collision occurring between a node in a central area of the present cell, and a node in a central area of an adjacent cell according to strong interference information reported by the node in the central area of the present cell, positional information of the node, and positional information of a node occupying the timeslot with resource collision, indicated by the node reporting strong interference information, and the shortest resource multiplexing distance, upon reception of the reported strong interference information, and to adjust a resource of the node in the central area of the present cell.

Preferably the processor is further configured, in a case that a node in a central area of the present cell shares a resource with the node in the edge area, to receive information which is about the resource occupied by the node in the edge area and transmitted by the node in the edge area, and to allocate a resource for the node in the central area according to the information about the resource occupied by the node in the edge area.

Preferably when the edge area shares resources allocated for the edge area with an adjacent cell to the cell, a resource accessed by a node in a central area in the same cell is orthogonal to a resource accessed by the node in the edge area.

Preferably the processor allocates different resources for the edge areas of different cells; or a same resource is allocated by a processor in an adjacent eNB for the edge area of the adjacent cell.

DETAILED DESCRIPTION OF THE EMBODIMENTS

Figure 1:
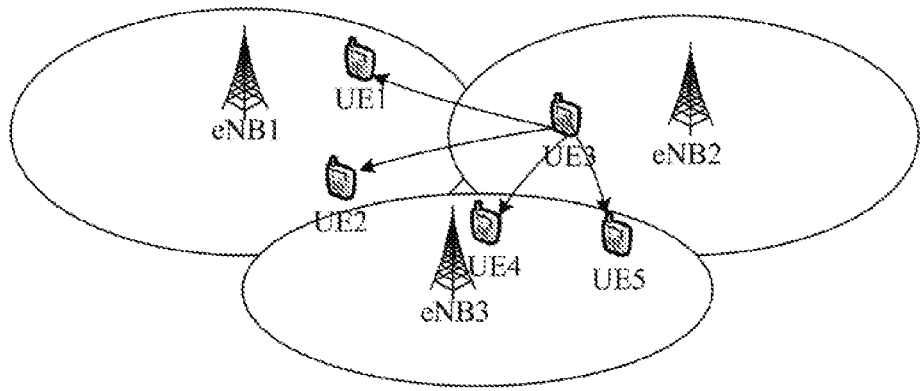
FIG. 1 is a schematic diagram of an inter-eNB D2D discovery and communication architecture in the related art.

The embodiments of the invention provide a method and apparatus for allocating a cell resource in a Device-to-Device (D2D) system so as to improve the reliability of communication at nodes in edge areas of different cells over an ad-hoc network in the edge areas.

In the embodiments of the invention, in view of a demand for reliable communication of a node over a D2D link between cells, in the case that resources are allocated centrally by eNBs in the respective cells, there may be resource collision between nodes in the different cells. In view of this problem, there is proposed a solution to interference coordination between areas over a D2D link between cells. On the precondition that an edge area of a pool of resources is preset validly, a node in the edge area accesses over an ad-hoc network, thus improving the reliability of communication between nodes in edge areas of different cells.

Simply a cell includes an edge area. When an ad-hoc mode is applied to the edge area, a scheduling entity allocates an ad-hoc pool of resources for the edge area, and for a central area of the cell other than the edge area of the cell, the scheduling entity centrally schedules and allocates D2D resources for respective nodes.

Here the scheduling entity can be an eNB, for example.

The ad-hoc pool of resources for the edge area can be configured in the following two schemes.

In a first scheme, no dedicated ad-hoc pool of resources needs to be allocated for the edge area, but the edge area shares a pool of resources with the central area, so the pool of resources for the edge area can be regarded as a dynamic pool of resources.

In a second scheme, a dedicated ad-hoc pool of resources is allocated for the edge area, but the ad-hoc pool of resources is shared among cells, that is, the pool of resources for the edge area is static or semi-static.

The first scheme above will be described below in details.

Firstly the edge area as referred to in the embodiments of the invention is defined below.

The D2D edge area is not the same concept as a Device to Network (D2N) edge area. Although a handover is still based upon a D2N link, the D2D edge area is defined independently of the D2N link; and D2D resources are primarily coordinated to thereby address valid communication between various UEs, and a demand of a UE for valid communication is directly dependent upon the particular position of the node, so the edge area is still defined based upon a geographical position.

On the precondition that the edge area shares the pool of resources with the central area, that is, the pool of resources for the edge is dynamic, the size of the edge area can be preset in the following two approaches.

In a first approach, the size of the edge area needs to be preset so that a resource will be allocated for a node in the central area of the present cell taking into account only resource allocation in the edge area of the present cell while disregarding any node in an edge area of an adjacent cell, that is, the size of the edge area (a guard zone) can enable the node in the central area of the present cell, and the node in the edge area of the adjacent cell to access a timeslot resource in a space division multiplexing mode. Taking a hop of 300 meters as an example, given the edge area (the guard zone), with the size of more than 600 meters, of the cell, the node in the central area of the present cell, and the node in the edge area of the adjacent cell to access a timeslot resource in a space division multiplexing mode without significant interference.

In a second approach, when the edge area is preset, but interference cannot be avoided, for example, in the case that the edge area of the cell is preset less than 600 meters, a node in the edge area of the present cell needs to report strong interference as an aid. Stated otherwise, the node in the edge area of the present cell reports detected strong interference after exchanging information in a distributed node, and the eNB determines collision occurring between the node in the central area of the present cell, and the node in the edge area of the adjacent cell according to reported timeslot information, positional information of the nodes, and the shortest resource multiplexing distance, so a timeslot resource access in the adjacent cell is prioritized, that is, a timeslot resource of the node in the central area of the present cell is adjusted.

Particularly, the following possible collision may occur while a resource is being allocated across eNBs.

In a first instance, collision occurs between the node in the central area of the present cell, and the node in the edge area of the present cell.

In a second instance, collision occurs between the node in the central area of the present cell, and the node in the edge area of the adjacent cell.

In a third instance, collision occurs between the node in the edge area of the present cell, and the node in the edge area of the adjacent cell.

In a fourth instance, collision occurs between the node in the central area of the present cell, and a node in the central area of the adjacent cell.

The possible potential collision above shall be addressed in a method for allocating a cellular D2D radio resource in a cell of an internet of vehicles, and collision detection in the different instances will be described below respectively.

In the first instance, collision occurs between the node in the central area of the present cell, and the node in the edge area of the present cell.

The node in the edge area obtains timeslot resources in a distributed mode (underlying sensing and interaction), but needs to notify a managing node to thereby avoid the managing node from allocating the resource for the node in the central area, which would otherwise result in collision, that is, the node in the edge area only provides the candidate timeslots, and the node in the central area determines a timeslot to be occupied by the node in the edge area, where the managing node can be an eNB, for example.

In the second instance, collision occurs between the node in the central area of the present cell, and the node in the edge area of the adjacent cell.

A scheduling entity in the cell may need to allocate a resource for the node in the central area taking into account a resource access condition of the node in the edge area of the adjacent cell.

The behavior of the node here is dependent upon the two previously preset sizes of the edge area.

In the first approach, the edge area can be preset so that the edge area of the adjacent cell to the present cell has little interference to the central area of the present cell that the node in the central area of the present cell, and the node in the edge area of the adjacent cell are enable to access a timeslot resource in a space division multiplexing mode.

In the second approach, when the edge area is preset so small that there is unneglectable interference of the edge area of the present cell to the central area of the present cell, the central area of the present cell needs to obtain interference information in the edge area of the adjacent cell. In a particular implementation, the node in the edge area of the present cell reports strong interference as an aid. That is, the node in the edge area of the present cell reports detected strong interference after exchanging information in a distributed mode (there are a number of possible collision objects including the node in the central area of the present cell, and the node in the edge area of the adjacent cell), and the eNB determines collision occurring between the node in the central area of the present cell, and the node in the edge area of the adjacent cell according to reported timeslot information, positional information of the nodes, and the shortest resource multiplexing distance, so a timeslot resource access in the adjacent cell is prioritized, that is, a timeslot resource of the node in the central area of the present cell is adjusted. In order to further improve the efficiency, an underlying technology needs to be involved in a general solution design, for example, there are different preambles for the node in the central area, and the node in the edge area, so that the node will report only information about collision occurring between the node in the central area, and the node in the edge area.

In a third instance, collision occurs between the node in the edge area of the present cell, and the node in the edge area of the adjacent cell.

The node in the edge area of the adjacent cell knows that a timeslot is selected and maintained in an ad-hoc mode without any additional processing.

In a fourth instance, collision occurs between the node in the central area of the present cell, and a node in the central area of the adjacent cell.

This is dependent upon the preset size of the edge area.

In the first approach, a guard area of these two nodes is equivalent to the sum of the edge areas of the two cells, and just one of the edge areas can be preset so that the edge area of the adjacent cell to the present cell has little interference to the central area of the present cell, so the two edge areas are sure to guarantee neglectable interference of the node in the central area of the adjacent cell to the central area of the present cell, and to enable the node in the central area of the present cell, and the node in the edge area of the adjacent cell to access a timeslot resource in a space division multiplexing mode.

In the second approach, when the edge area is preset so small that there is unneglectable interference of the edge area of the present cell to the central area of the present cell, a guard area of these two nodes is equivalent to the sum of the edge areas of the two cells, that is, there are the following two possibilities.

In a first possibility, the size of the resulting edge area is doubled so that there is neglectable interference of the node in the central area of the adjacent cell to the central area of the present cell, and the node in the central area of the present cell, and the node in the central area of the adjacent cell can access a timeslot resource in a space division multiplexing mode, particularly as in the first approach.

In a second possibility, the size of the resulting edge area is doubled, but there is still unneglectable interference of the node in the central area of the adjacent cell to the central area of the present cell, and, so the node in the edge area can further detect and report strong interference as an aid, particularly as in the second instance in which collision is detected between "the node in the central area of the present cell, and the node in the edge area of the adjacent cell", so a repeated description thereof will be omitted here.

In a particular implementation, a particular suggestion on a designed size of the edge area is that the edge area of the cell (the guard zone) be sized of at least two hops, so that the node in the central area of the present cell, and the node in the edge area of the adjacent cell can access a timeslot resource in a space division multiplexing mode, and the smallest spacing between central areas of two adjacent cells be sized of four hops.

The second scheme above (in which a dedicated pool of resources is allocated for the edge area) will be described below in details.

The edge area will be defined here again.

Generally as in the first scheme above "in which no dedicated pool of resources is allocated for the edge area", the edge area is defined based upon a geographical position.

However, there is not any interference between the central area and the edge area due to the dedicated pool of resources, so only interference between the central area of the present cell, and the central area of the adjacent cell will be isolated using the edge area(s) as a guard zone.

Particularly, the ad-hoc pool of resources for the edge area is preset that a timeslot resource for the node in the central area in the cell is orthogonal to a timeslot resource for the node in the edge area. The cells can operate in the following two schemes.

In a first scheme, separate pools of resources are allocated; and the eNB cooperates with its adjacent eNBs, and can know the pools of resources for the edge areas of its adjacent cells, and also the node in the cell can access a set of ad-hoc pools of resources for all the edge areas of its adjacent cells.

In a second scheme, the eNB can interact and coordinate with its adjacent eNBs via an X2 interface, and the same pool of resources is allocated.

Alike four types of possible potential collision shall be addressed in a method for allocating a cellular D2D radio resource in a cell of an internet of vehicles, and collision detection in the different instances will be described below respectively.

In a first instance, collision occurs between the node in the central area of the present cell, and the node in the edge area of the present cell.

Collision between the node in the edge area of the present cell, and the node in the central area of the present cell will not be taken into account due to a dedicated pool of resources.

In a second instance, collision occurs between the node in the central area of the present cell, and the node in the edge area of the adjacent cell.

Resource collision can be avoided from occurring while the scheduling entity is allocating a resource, due to interaction about a dedicated pool of resources.

In a third instance, collision occurs between the node in the edge area of the present cell, and the node in the edge area of the adjacent cell.

Collision is sensed and avoided in an ad-hoc mode.

In a fourth instance, collision occurs between the node in the central area of the present cell, and the node in the central area of the adjacent cell.

This is dependent upon the preset size of the edge area because a guard zone of these two nodes is equivalent to the sum of the edge areas of the two cells, particularly as in the scheme above "in which no dedicated pool of resources is allocated for the edge area".

I. The guard zone is the sum of two edge areas so that there is little interference of the node in the central area of the adjacent cell to the node in the central area of the present cell, and the node in the central area of the present cell, and the node in the central area of the adjacent cell can access a resource in a multiplexing mode.

II. Although the guard zone is the sum of two edge areas, there is still unneglectable interference of the node in the central area of the adjacent cell to the node in the central area of the present cell. In this case, strong interference is reported, particularly as in the instance in which it is unnecessary to allocate a dedicated pool of resources for the edge area, so a repeated description thereof will be omitted here.

In a particular implementation, a particular suggestion on a designed size of the edge area is that the edge area of the cell be sized of at least one hop, so the smallest spacing between central areas of two adjacent cells be sized of two hops, that is, the node in the central area of the present cell, and the node in the central area of the adjacent cell can access a resource in a space division multiplexing mode.

Figure 2:
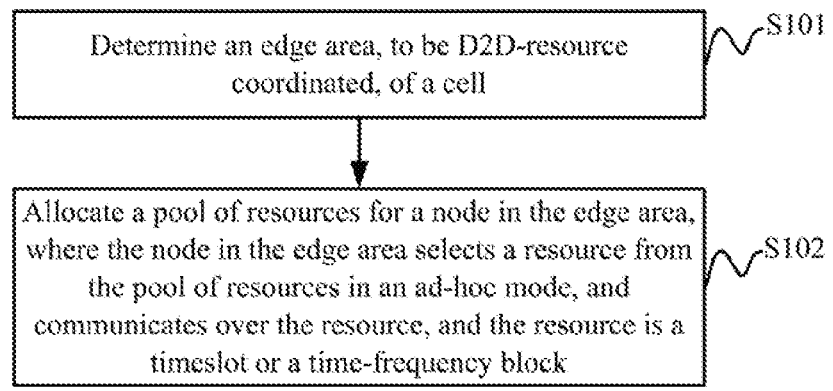
FIG. 2 is a schematic flow chart of a method for allocating a cell resource in a D2D system according to an embodiment of the invention.

As can be apparent, referring to FIG. 2, for example, an embodiment of the invention provides a method for allocating a cell resource in a Device to Device (D2D) system, where the method includes the following steps.

The step S101 is to determine an edge area, to be D2D-resource coordinated, of a cell.

The step S102 is to allocate a pool of resources for a node in the edge area, where the node in the edge area selects a resource from the pool of resources in an ad-hoc mode, and communicates over the resource, and the resource is a timeslot or a time-frequency block.

With this method, the edge area, to be D2D-resource coordinated, of the cell is determined, and the pool of resources is allocated for the node in the edge area, where the node in the edge area selects a resource from the pool of resources in an ad-hoc mode, and communicates over the resource, and the resource is a timeslot or a time-frequency block, so that the edge area is defined, and the ad-hoc mode is applied to the edge area, thus improving the reliability of communication between nodes in edge areas of different cells.

Preferably the edge area, to be D2D-resource coordinated, of the cell is determined as follows.

The edge area of the cell is determined according to the required shortest resource multiplexing distance, the size of the cell, and the allocation of the pool of resources, so that it can be determined whether the node is located in the edge area of the node, according to the geographical position of the UE in the cell.

The required shortest resource multiplexing distance is N times the shortest communication distance, where N is a number greater than or equal to 2.

The size of the edge area needs to be greater than or equal to the shortest resource multiplexing distance, and if the shortest resource multiplexing distance is not satisfied, then the size of the edge area will be at least greater than the shortest communication distance.

When the radius of the cell is a relatively high multiple of the shortest communication distance, the size of the edge area can be made larger.

When the radius of the cell is a relatively low multiple of the shortest communication distance, the size of the edge area can be made smaller, but still needs to satisfy the requirement above.

When dedicated resources are allocated for the edge area of the cell, the edge area can be made smaller.

When the edge area shares resources with a central area, the edge area needs to be made larger.

Preferably the edge area in the cell shares a pool of resources with the central area other than the edge area or shares resources allocated for the edge area with the adjacent cell to the cell.

Preferably the method further includes: determining collision occurring between the node in the central area of the present cell, and the node in the edge area of the adjacent cell according to strong interference information reported by the node in the edge area of the present cell, positional information of the node and the node occupying the timeslot with resource collision, indicated by the node, and the shortest resource multiplexing distance, upon reception of the reported strong interference information, and adjusts the resource of the node in the central area of the present cell. For example, if a node A reports collision occurring with a timeslot 1, then the eNB will determine that all of nodes B, C, and D are currently accessing the timeslot 1, and furthermore the node B is at a shorter distance from the node A (in the edge area), according to recorded positional information and resource occupancy information of the nodes, and thus can determine that there may be collision occurring between the node B in the central area, and another node in the edge area (which may be the node C, or the node D), and here an access of the node in the edge area is prioritized, that is, the resource of the node B in the central area is adjusted.

And/or, the method further includes: determining collision occurring between the node in the central area of the present cell, and the node in the central area of the adjacent cell according to strong interference information reported by the node in the central area of the present cell, positional information of the node, and the node occupying the timeslot with resource collision, indicated by the node, and the shortest resource multiplexing distance, upon reception of the reported strong interference information, and adjusts the resource of the node in the central area of the present cell. For example, if a node A reports collision occurring with a timeslot 1, then the eNB will determine that all of nodes B, C, and D are currently accessing the timeslot 1, and furthermore the node B is at a shorter distance from the node A (in the central area), according to recorded positional information and resource occupancy information of the nodes, and thus can determine that there may be collision occurring between the node B in the central area of the present cell, and another node in the central area of the adjacent cell (which may be the node C, or the node D), and here an access of the node in the central area of the adjacent cell is prioritized, that is, the resource of the node B in the central area of the present is adjusted.

Preferably the method further includes: in the case that the node in the central area of the present cell shares a resource with the node in the edge area, receiving information, about the resource occupied by the node in the edge area, transmitted by the node in the edge area, and allocating a resource for the node in the central area according to the information about the resource occupied by the node in the edge area.

Preferably when the edge area shares resources allocated for the edge area with the adjacent cell to the cell, a resource accessed by the node in the central area in the same cell is orthogonal to a resource accessed by the node in the edge area. Stated otherwise, a dedicated pool of resources needs to be allocated for the edge area.

Preferably different resources are allocated for the edge areas of the different cells; or the same resource is allocated by the adjacent eNB for the edge area of the adjacent cell.

Two particular embodiments will be described below in brief.

In a first embodiment, a node in an edge area contends for a resource in an ad-hoc mode, and resources accessed in the ad-hoc mode, and resources allocated by a scheduling entity for an access thereto are not limited.

The eNB acting as the scheduling entity operates particularly as follows.

The eNB defines the edge area.

The eNB determines a resulting timeslot resource for a node in the edge area of the present cell according to candidate timeslots reported by the node in the edge area in combination with information about a resource allocated for a node in a central area of the present cell, and records a resource access condition of the node in the edge area of the present cell.

The eNB receives strong interference reported by the node in the edge area, and then if the eNB determines collision occurring with the node in the central area, then the eNB will readjust the timeslot resource of the node in the central area. Particularly the eNB can determine collision possibly occurring with the node in the central area according to reported timeslot information, positional information of the nodes, and the shortest resource multiplexing distance, or different preambles can be applied to the different nodes, and the eNB can determine collision possibly occurring with the node in the central area according to a node report.

The eNB allocates a timeslot resource for the node in the central area, particularly taking into account timeslot resource access conditions of the other nodes in the central area of the present cell, and timeslot occupancy information of, and information about the strong interference to the node in the edge area of the present cell. The eNB needs to record the allocated timeslot resource after allocating the resource.

The node in the edge area operates as follows.

The node selects the timeslots in the ad-hoc mode by selecting, and notifying the scheduling entity, of several candidate timeslots.

The node reports the strong interference information.

The node in the central area operates as follows.

The node transmits service data over the resource allocated by the eNB.

In a second embodiment, a node in an edge area contends for a resource in an ad-hoc mode, and there is a pool of resources in the ad-hoc mode, but the pool of resources is shared among cells.

The eNB side operates as follows.

The eNB defines the edge area.

The eNB allocates the pool of resources for the edge area.

The eNB can allocate a separate pool of resources, and also coordinate with an adjacent eNB, and nodes in the cell can access a set of the pool of resources. The eNB broadcasts the set of the pool of resources. Alternatively the eNB can coordinate with the adjacent eNB, and the same pool of resources can be allocated.

The eNB receives strong interference reported by the node in the edge area, and then if the eNB determines collision occurring with a node in a central area, then the eNB will readjust a timeslot resource of the node in the central area. Particularly the eNB can determine collision possibly occurring with the node in the central area according to reported timeslot information, positional information of the nodes, and the shortest resource multiplexing distance, or different preambles can be applied to the different nodes, and the eNB can determine collision possibly occurring with the node in the central area according to a node report.

The eNB allocates a timeslot resource for the node in the central area, particularly taking into account only timeslot resource access conditions of the other nodes in the central area of the present cell, and information about the strong interference. The eNB needs to record the allocated timeslot resource after allocating the resource.

The node in the edge area operates as follows.

The node selects timeslots in an ad-hoc mode.

The node reports the strong interference to the eNB.

The node in the central area operates as follows.

The node transmits service data over the resource allocated by the eNB.

Figure 3:
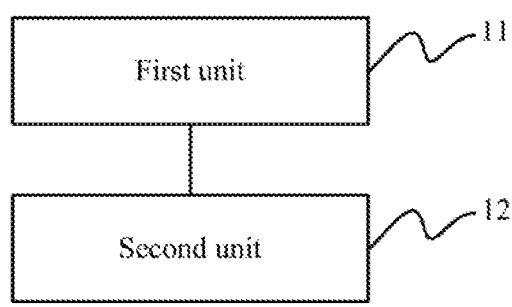
FIG. 3 is a schematic structural diagram of an apparatus for allocating a cell resource in a D2D system according to an embodiment of the invention.

Referring to FIG. 3, an embodiment of the invention provides an apparatus for allocating a cell resource in a Device to Device (D2D) system, for example, at the eNB side, where the apparatus includes followings.

A first unit 11 is configured to determine an edge area, to be D2D-resource coordinated, of a cell.

A second unit 12 is configured to allocate a pool of resources for a node in the edge area, where the node in the edge area selects a resource from the pool of resources in an ad-hoc mode, and communicates over the resource, and the resource is a timeslot or a time-frequency block.

Preferably the first unit is configured to determine the edge area of the cell according to the shortest resource multiplexing distance, the size of the cell, and the allocation of the pool of resources.

Preferably the edge area in the cell shares a pool of resources with a central area other than the edge area; or shares resources allocated for the edge area with an adjacent cell to the cell.

Preferably the second unit is further configured to determine collision occurring between a node in a central area of the present cell, and a node in an edge area of an adjacent cell according to strong interference information reported by the node in the edge area of the present cell, positional information of the node, and the node occupying the timeslot with resource collision, indicated by the node, and the shortest resource multiplexing distance, upon reception of the reported strong interference information, and to adjust a resource of the node in the central area of the present cell; and/or to determine collision occurring between a node in a central area of the present cell, and a node in a central area of an adjacent cell according to strong interference information reported by the node in the central area of the present cell, positional information of the node, and the node occupying the timeslot with resource collision, indicated by the node, and the shortest resource multiplexing distance, upon reception of the reported strong interference information, and to adjust a resource of the node in the central area of the present cell.

Preferably the second unit is further configured, in the case that a node in a central area of the present cell shares a resource with the node in the edge area, to receive information, about the resource occupied by the node in the edge area, transmitted by the node in the edge area, and to allocate a resource for the node in the central area according to the information about the resource occupied by the node in the edge area.

Preferably when the edge area shares resources allocated for the edge area with an adjacent cell to the cell, a resource accessed by a node in a central area in the same cell is orthogonal to a resource accessed by the node in the edge area.

Preferably the second unit allocates different resources for the edge areas of the different cells; or the same resource is allocated by a second unit in an adjacent eNB for the edge area of the adjacent cell.

Figure 4:
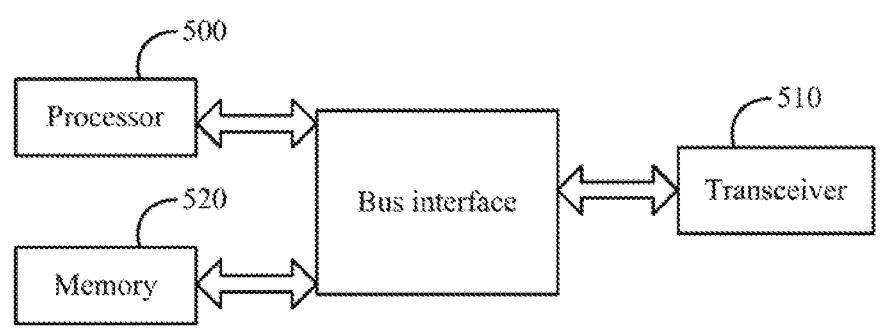
FIG. 4 is a schematic structural diagram of another apparatus for allocating a cell resource in a D2D system according to an embodiment of the invention.

Referring to FIG. 4, an embodiment of the invention provides another apparatus for allocating a cell resource in a Device to Device (D2D) system, for example, at the eNB side, where the apparatus includes follows.

A processor 500 is configured to read and execute program in a memory 520 to determine an edge area, to be D2D-resource coordinated, of a cell; and to allocate a pool of resources for a node in the edge area, where the node in the edge area selects a resource from the pool of resources in an ad-hoc mode, and communicates over the resource, and the resource is a timeslot or a time-frequency block.

Preferably the processor 500 determines the edge area of the cell according to the shortest resource multiplexing distance, the size of the cell, and the allocation of the pool of resources.

Preferably the edge area in the cell shares a pool of resources with a central area other than the edge area; or shares resources allocated for the edge area with an adjacent cell to the cell.

Preferably the processor 500 is further configured to determine collision occurring between a node in a central area of the present cell, and a node in an edge area of an adjacent cell according to strong interference information reported by the node in the edge area of the present cell, positional information of the node, and the node occupying the timeslot with resource collision, indicated by the node, and the shortest resource multiplexing distance, upon reception of the reported strong interference information, and to adjust a resource of the node in the central area of the present cell; and/or to determine collision occurring between a node in a central area of the present cell, and a node in a central area of an adjacent cell according to strong interference information reported by the node in the central area of the present cell, positional information of the node, and the node occupying the timeslot with resource collision, indicated by the node, and the shortest resource multiplexing distance, upon reception of the reported strong interference information, and to adjust a resource of the node in the central area of the present cell.

Preferably the processor 500 is further configured, in the case that a node in a central area of the present cell shares a resource with the node in the edge area, to receive information, about the resource occupied by the node in the edge area, transmitted by the node in the edge area, and to allocate a resource for the node in the central area according to the information about the resource occupied by the node in the edge area.

Preferably when the edge area shares resources allocated for the edge area with an adjacent cell to the cell, a resource accessed by a node in a central area in the same cell is orthogonal to a resource accessed by the node in the edge area.

Preferably the processor 500 allocates different resources for the edge areas of the different cells; or the same resource is allocated by a processor in an adjacent eNB for the edge area of the adjacent cell.

The transceiver 510 is configured to be controlled by the processor 500 to receive and transmit data.

Here in FIG. 4, the bus architecture can include any number of interconnecting buses and bridges to particularly link together various circuits including one or more processors represented by the processor 500, and one or more memories represented by the memory 520. The bus architecture can further link together various other circuits. e.g., prophetical devices, manostats, power management circuits, etc., all of which are well known in the art, so a further description thereof will be omitted in this context. The bus interface serves as an interface. The transceiver 510 can be a number of elements including a transmitter and a receiver, which are units for communication with various other devices over a transmission medium. The processor 500 is responsible for managing the bus architecture and performing normal processes, and the memory 520 can store data for use by the processor 500 in performing the operations.

In summary, in the technical solutions according to the embodiments of the invention, the ad-hoc mode is applied to the edge area so that it is determined that the UE is located at the center or the edge of the cell, according to the accurate geographical position thereof; and there may be a dedicated pool of resources in the ad-hoc mode, but these resources can be shared among the cells. The resources in the ad-hoc mode, and the resources allocated by the scheduling entity for an access thereto can be shared. Accordingly in the inter-cell coordination solution according to the embodiments of the invention, the entire distributed contention resolution solution is applied to the edge area. As compared with the solution in the prior art, the ad-hoc mode is applied to the edge area to thereby guarantee reliable communication between the nodes in the edge areas of the different cells as much as possible, and also improve the utilization ratio of the resources as many as possible at a low interaction cost via the X2 interface so as to avoid the capacity of the system from being degraded.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for allocating a cell resource in a Device to Device (D2D) system, the method comprises:
    determining an edge area, to be D2D-resource coordinated, of a cell according to a shortest resource multiplexing distance, a size of the cell, and an allocation of the ad-hoc pool of resources; and
    allocating an ad-hoc pool of resources for a node in the edge area, wherein the node in the edge area obtains a resource in a distributed mode from the ad-hoc pool of resources, and reports obtained resource to a base station, the distributed mode comprises underlying sensing and interaction, and
    determining a resulting resource for the node in the edge area according to the obtained resource reported by the node in the edge area and a collision occurring between the node in the edge area and a node in a central area; wherein the resource is a timeslot or a time-frequency block;
    wherein the edge area in the cell shares the ad-hoc pool of resources with a central area other than the edge area; or shares resources allocated for the edge area with an adjacent cell to the cell;
    wherein if a node in a central area of the present cell shares a resource with the node in the edge area, the method further comprises:
    receiving information which is about the resource occupied by the node in the edge area and transmitted by the node in the edge area; and
    allocating a resource for the node in the central area according to the information about the resource occupied by the node in the edge area.

2. The method according to claim 1, wherein the method further comprises:
    determining collision occurring between a node in a central area of the present cell, and a node in an edge area of an adjacent cell according to strong interference information reported by the node in the edge area of the present cell, positional information of the node, and positional information of a node occupying the timeslot with resource collision, indicated by the node reporting the strong interference information, and the shortest resource multiplexing distance, upon reception of the reported strong interference information, and to adjust a resource of the node in the central area of the present cell;
    and/or
    to determine collision occurring between a node in a central area of the present cell, and a node in a central area of an adjacent cell according to strong interference information reported by the node in the central area of the present cell, positional information of the node, and positional information of a node occupying the timeslot with resource collision, indicated by the node reporting the strong interference information, and the shortest resource multiplexing distance, upon reception of reported strong interference information, and to adjust a resource of the node in the central area of the present cell.

3. The method according to claim 1, wherein when the edge area shares resources allocated for the edge area with an adjacent cell to the cell, a resource accessed by a node in a central area in a same cell is orthogonal to a resource accessed by the node in the edge area.

4. The method according to claim 3, wherein different resources are allocated for the edge areas of different cells; or a same resource is allocated by an adjacent eNB for the edge area of the adjacent cell.

5. An apparatus for allocating a cell resource in a Device to Device (D2D) system, the apparatus comprises:
    a processor configured to read and execute a program in a memory;

to determine an edge area, to be D2D-resource coordinated, of a cell according to a shortest resource multiplexing distance, a size of the cell, and an allocation of the ad-hoc pool of resources; and to allocate an ad-hoc pool of resources for a node in the edge area, wherein the node in the edge area obtains a resource in a distributed mode from the ad-hoc pool of resources, and reports obtained resource to the apparatus; the distributed mode comprises underlying sensing and interaction, and to determine a resulting resource for the node in the edge area according to the obtained resource reported by the node in the edge area and a collision occurring between the node in the edge area and a node in a central area; wherein the resource is a timeslot or a time-frequency block;

wherein the edge area in the cell shares the ad-hoc pool of resources with a central area other than the edge area; or shares resources allocated for the edge area with an adjacent cell to the cell;

wherein if a node in a central area of the present cell shares a resource with the node in the edge area, the processor is further configured:

to receive information which is about the resource occupied by the node in the edge area and transmitted by the node in the edge area; and to allocate a resource for the node in the central area according to the information about the resource occupied by the node in the edge area.

6. The apparatus according to claim 5, wherein the processor is further configured:

to determine collision occurring between a node in a central area of the present cell, and a node in an edge area of an adjacent cell according to strong interference information reported by the node in the edge area of the present cell, positional information of the node, and positional information of a node occupying the timeslot with resource collision, indicated by the node reporting the strong interference information, and the shortest resource multiplexing distance, upon reception of the reported strong interference information, and to adjust a resource of the node in the central area of the present cell;

and/or to determine collision occurring between a node in a central area of the present cell, and a node in a central area of an adjacent cell according to strong interference information reported by the node in the central area of the present cell, positional information of the node, and positional information of a node occupying the timeslot with resource collision, indicated by the node reporting the strong interference information, and the shortest resource multiplexing distance, upon reception of the reported strong interference information, and to adjust a resource of the node in the central area of the present cell.

7. The apparatus according to claim 5, wherein when the edge area shares resources allocated for the edge area with an adjacent cell to the cell, a resource accessed by a node in a central area in the same cell is orthogonal to a resource accessed by the node in the edge area.

8. The apparatus according to claim 7, wherein the processor allocates different resources for the edge areas of different cells; or a same resource is allocated by a processor in an adjacent eNB for the edge area of the adjacent cell.

* * * * *